Figure 1:
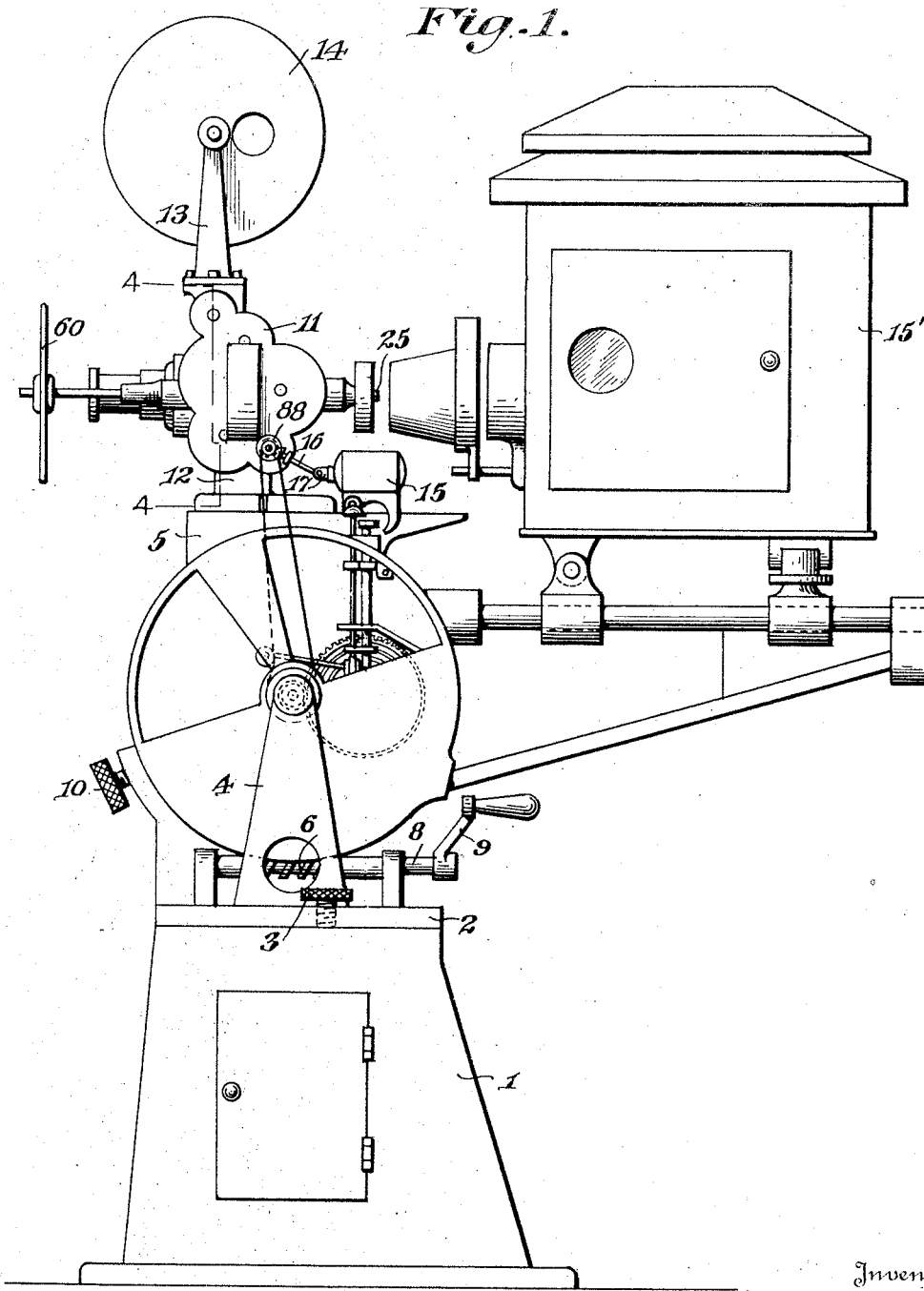

May 26, 1925. 1,539,036
O. J. ARNETT
MOTION PICTURE MACHINE
Filed Dec. 8, 1921 6 Sheets-Sheet 1

Witnesses
Jas. K. McCathran

Inventor
Oliver J. Arnett,
By Richard B. Owen
Attorney

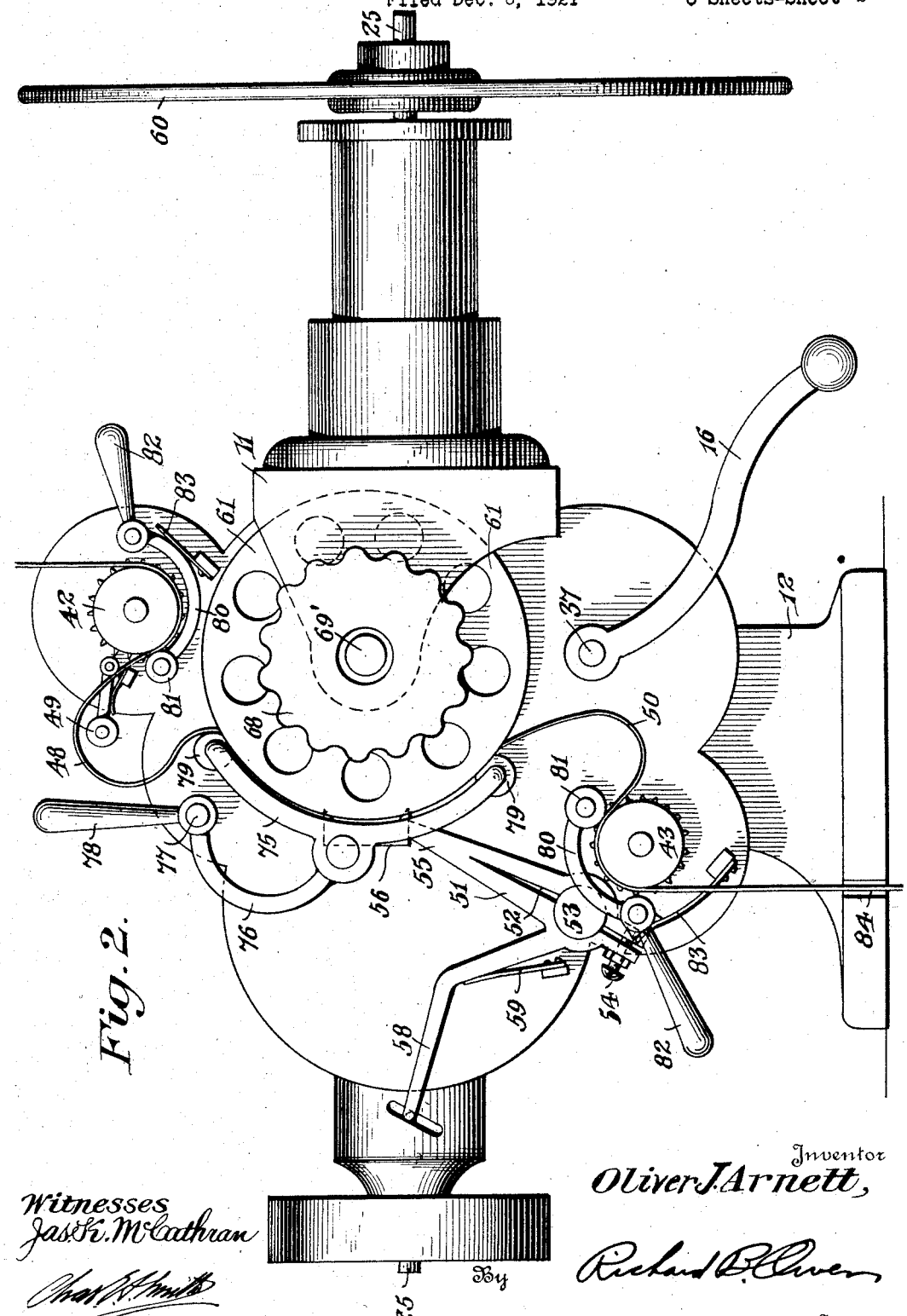

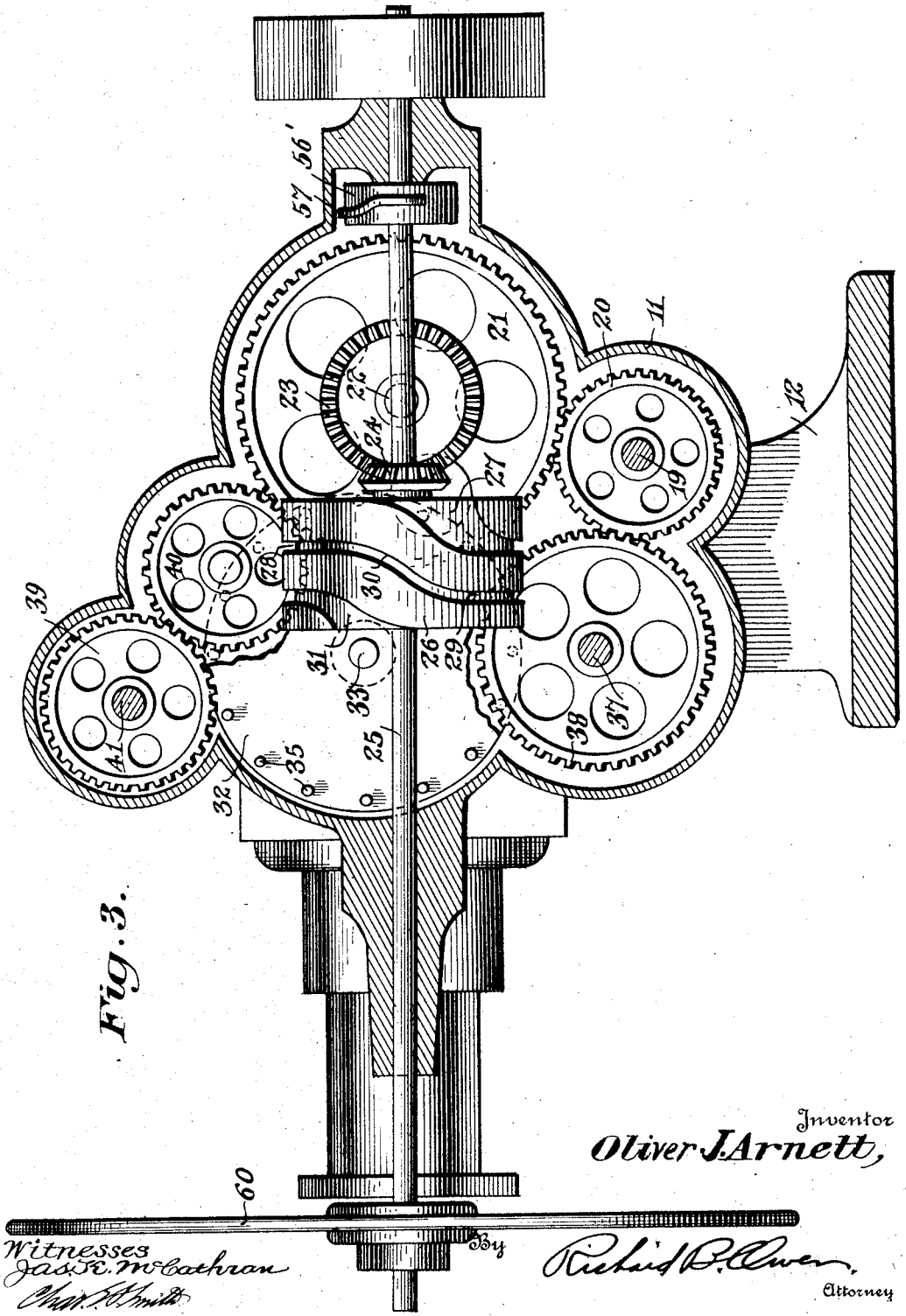

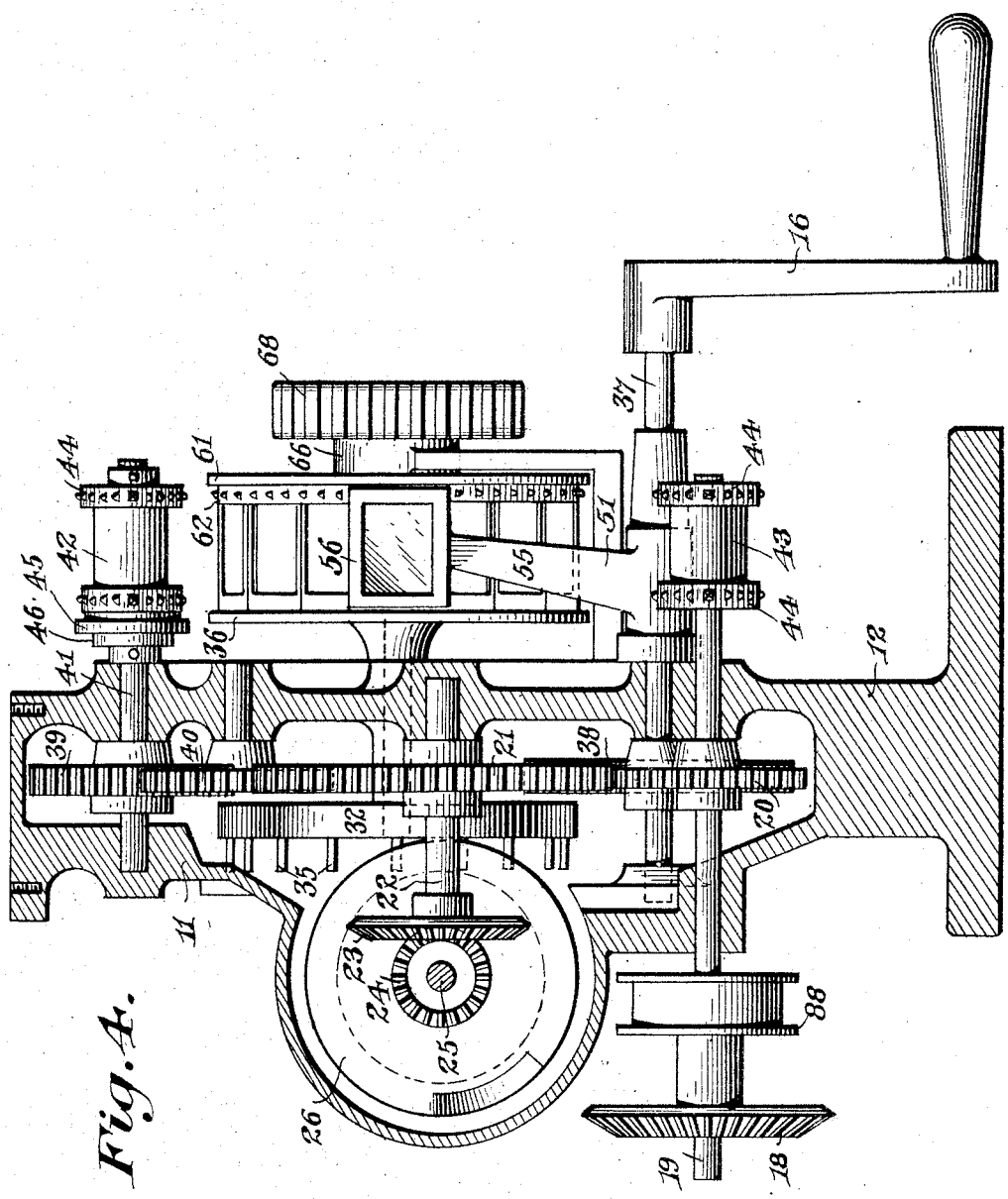

May 26, 1925.                                                                 1,539,036
O. J. ARNETT
MOTION PICTURE MACHINE
Filed Dec. 8, 1921                    6 Sheets-Sheet 5
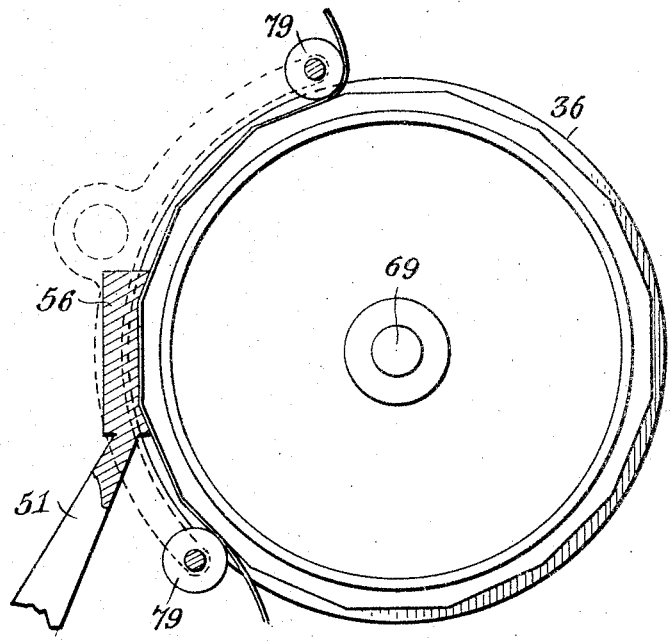
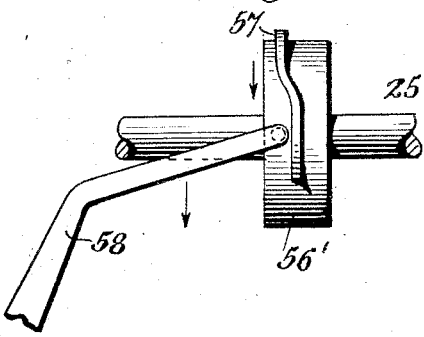
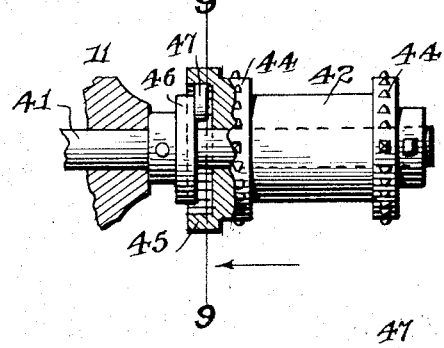
Witnesses                                                    Inventor
Jas. K. McCathran                                  Oliver J. Arnett,
Chas. P. Smith                               By Richard B. Owen,
                                                            Attorney May 26, 1925.

O. J. ARNETT 1,539,036

MOTION PICTURE MACHINE

Filed Dec. 8, 1921      6 Sheets-Sheet 6

Witnesses
Jas. F. McCathran

Inventor
Oliver J. Arnett,
By Richard B. Owen,
Attorney

Patented May 26, 1925.

1,539,036

UNITED STATES PATENT OFFICE.

OLIVER J. ARNETT, OF MEMPHIS, TEXAS.

MOTION-PICTURE MACHINE.

Application filed December 8, 1921. Serial No. 520,948.

*To all whom it may concern:*

Be it known that I, OLIVER J. ARNETT, a citizen of the United States, residing at Memphis, in the county of Hall and State of Texas, have invented certain new and useful Improvements in a Motion-Picture Machine, of which the following is a specification.

The present invention has relation to certain improvements in motion picture machines and particularly projectors, and has special reference to the provision of a simple, and effective mechanism for feeding a film intermittently or step by step through the projector which mechanism shall have a high degree of accuracy so that the film will be moved exactly the required distance each time.

Another important object of the invention is to provide a driving mechanism for the intermittent feeding mechanism, and a shutter on the same shaft so that these parts may not become out of adjustment.

Another object of the invention is to provide means for preventing the film from becoming broken or torn should the upper loop be taken up.

A further object of the invention is to generally improve upon motion picture projecting machines by providing a device which will be of extremely simple, durable and inexpensive construction, one which is efficient and reliable in operation, and well adapted to the purpose for which it is designed.

With these and numerous other objects in view, which will appear as the description progresses, the invention resides in certain novel features of construction, and the combination and arrangement of parts as will be hereinafter fully described and claimed.

In the drawing:—

Figure 6:
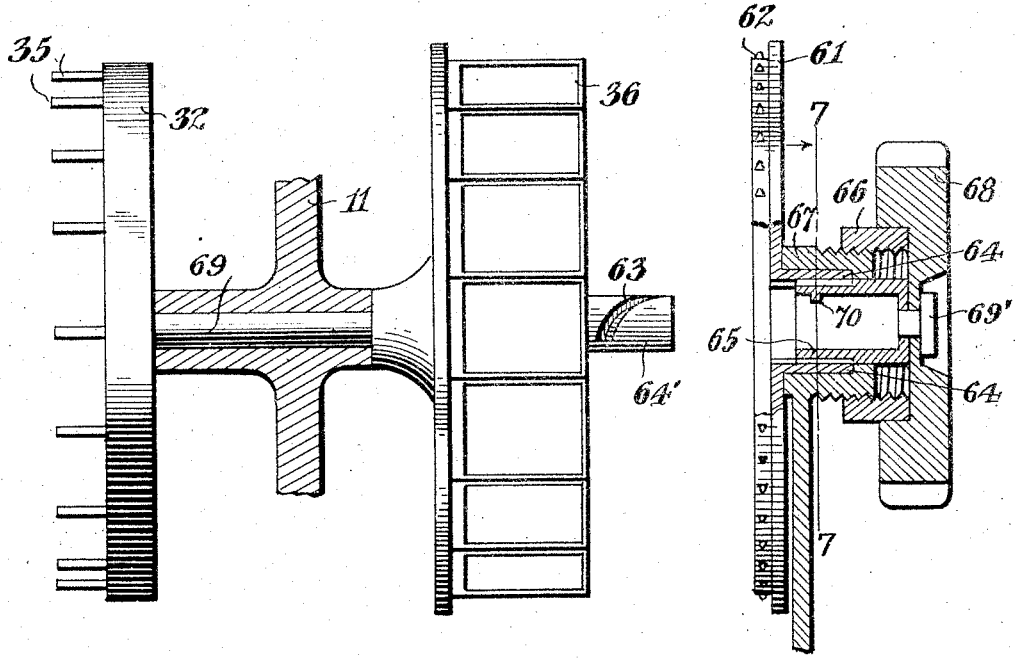
Figure 7:
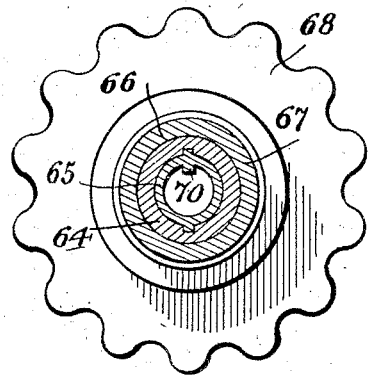

Figure 1 is a left hand side elevation of the entire projecting apparatus of a motion picture machine embodying my invention, Figure 2 is a right hand elevation of the head thereof, Figure 3 is a section through the head casing showing the interior parts from a left hand elevation, Figure 4 is a vertical transverse section through the head, Figure 5 is a detailed view of the framing sprocket, Figure 6 is a detailed view of the framing sprocket with the pin wheel and the framing adjusting mechanism, Figure 7 is a section taken on the line 7—7 of Figure 6, Figure 8 is a detailed view showing the ratchet connection of the upper feed sprocket roller and its drive shaft 41, Figure 9 is a section taken on the line 9—9 of Figure 8 looking in the direction of the arrow, Fig. 10 is a detailed view of the operating mechanism for the film holding device associated with the framing sprocket.

Referring to the drawings in detail it will be seen that the base or stand 1 which may be of any preferred construction is provided with the usual panorama plate 2 which may be locked against movement on the stand 1 by the set screw 3. The standards 4 are mounted on the panorama plate 2 so that the frame 5 may be journalled thereon whereby it may be tilted by operating the worm 6 on the shaft 8 which is controlled by the crank 9. This frame 5 is capable of being locked by a set screw 10. The head 11 is provided with the base 12 mounted on the frame 5 and has its working parts or the film mechanism encased in a dust-proof housing. The standards 13 project from the upper portion of the head 11 and the upper magazine 14 is journalled therebetween. A lamp house 15' of any preferred construction is mounted to the rear of the frame 5 as is shown in Figure 1.

The film mechanism in the head 11 is driven either by the motor 15 or crank 16. The motor 15 rotates the shaft 16 through the universal joint 17 and this shaft has upon its end a beveled pinion meshing with the beveled pinion 18 (see Figure 4) on the drive shaft 19 of the film mechanism. This shaft 19 is journalled in the lower end of the head 11 and has a gear 20 keyed thereto within the housing that is in mesh with a gear 21 centrally located in the housing and keyed to the shaft 22. These shafts 19 and 22 extend transversely of the head 11. The beveled gear 23 is keyed on the end of the shaft 22 and meshes with a beveled pinion 24 keyed to a shaft 25 that extends longitudinally of the head as is seen in Figure 3. Upon this shaft 25 adjacent the beveled pinion 24 there is situated a grooved gear element 26 which rotates with the shaft. The groove in the gear element 26 has its entrance at 27 which entrance is curved inwardly and communicates with a straight portion 28 which communicates with the straight portion 29 through the curved portion 30. The outlet 31 is also curved. A pin wheel 32, mounted on the shaft 33 that extends transversely of the head, is provided with an annular series of equally spaced pins 35 arranged adjacent its periphery and projecting toward the shaft 25 so as to be engaged by the grooved gear element 26. One of the pins will enter through the curved entrance 27 when this gear element 26 is rotating thereby causing the rotation of the pin wheel 32 until the pin arrives in the straight portion 28 at which time the movement of the pin wheel 32 will cease until the curved portion 30 reaches the pin at which time another pin will enter the entrance 27 and these two pins engaging the curved portion 30 and 27, will cause further rotation of the pin wheel 32. The shaft 33 has keyed to its other end a sprocket 36 (see Figures 4 and 6) which will rotate therewith. The mechanism thus far described, it will be seen, imparts an intermittent movement to the sprocket 36 which movement is divided so that each actuation of the pin wheel 32 will cause the rotation of the sprocket 36 sufficiently to project one picture on the screen.

The mechanism thus described may also be operated through the crank 16, shaft 37 and gear 38. The gear 21 (see Figure 4) is also adapted to rotate the gear 39 through the idler gear 40. The gear 39 is keyed to the shaft 41 which has mounted on one end a feeding sprocket roller 42. It will also be noted that the shaft 19 is extended so as to have upon one end a take up roller 43 keyed thereto. These rollers 42 and 43 are of the same general construction being provided with the teeth 44 for engaging the apertures marginally arranged in the film as is well understood in the art. The roller 42, however, is not keyed to the shaft 41 but is capable of rotating independently thereof in one direction. As is shown to advantage in Figures 8 and 9 a ratchet cylinder 45 is provided on the inner end of the feeding roller 42 and a disk 46 is keyed to the shaft 41 so that a dog 47 which is spring pressed may engage the teeth on the inner periphery of the cylinder 45 whereby the feeding roller 42 will rotate with the shaft 41 in one direction and if necessary may rotate in the same direction therewith but faster because of this pawl and ratchet feature as is desirable in forming loop and threading the machine as will appear later. The film from the upper magazine 14 is trained under the roller 42 as is shown in Figure 2 and is looped as at 48 so as to pass over the spring pressed idler 49 which would prevent the film from breaking should the loop 48 be taken up. The film engages the sprocket 36 and passes over the take-up roller 43 after being looped as at 50. The sprocket 36 is of hollow drum like construction having a plurality of flat surfaces equal in number to pins 35 which are provided with rectangular openings therein and the film is framed thereon so that each picture registers with one of the openings in the flat surfaces as is indicated to advantage in Figure 5.

It is, of course, desirable that each picture as it is being projected through the mechanism shall be in firm engagement with the flat surface which is in registry with the source of light or rays that are allowed to pass therethrough. I have, therefore, provided a film holding and a framing mechanism for the sprocket 36 which consists of the bell crank lever 51 which is split at 52 so that it may be fulcrumed on the pin 53 by the set screw 54. The arm 55 is provided with the shoe 56 having its inner face shaped so as to fit snugly on one flat surface of the sprocket 36 and also project a distance on the two adjacent faces or flat surfaces. This shoe 56 is provided with an opening framing with the picture through which the light rays project. A wheel 56' is keyed to the shaft 25 and has on its periphery a curved or cam rib 57 which is adapted to be engaged by a pin on the end of the arm 59 of the bell crank lever 51 whereby, when a portion of the cam rib 57 engages the pin, the lever 51 will fulcrum so that the shoe 56 will be moved away from the sprocket 36. This shoe is normally held in engagement with the sprocket by the leaf spring 59 mounted on the housing and bearing against the arm 50. It is, of course, to be understood that the rib 57 is so arranged on the wheel 56' that it will actuate the bell crank lever 51 when the pin wheel 32 is about to be rotated by the gear element 26 which is mounted on the same shaft with the wheel 56'. The shutter 60 is also mounted on the shaft 25, and, of course, is associated with the other mechanism in proper adjustment so as to allow the rays of light to penetrate or be projected from the device when the same passes through the sprocket 36. The shutter 60, gear element 26, and wheel 56' being keyed to the same shaft 25 prevent these parts from becoming out of adjustment with each other.

The sprocket 36 is formed in two sections as is shown in Figures 6 and 7. One section consists of the sprocket proper shown to the left in Figure 6 while the other section consists of the sprocket plate 61 having the toothed flange 62 the teeth of which are adapted to engage the marginal apertures of the film. A framing mechanism is associated with the plate 62. The sprocket plate 62 is adjustable so that the film when being threaded on the device may be so adjusted that a picture or the pictures register with the openings in the flat surfaces on the sprocket 36. A groove 63 is provided in the end of the stub shaft 64' which receives the sprocket plate 62 and its framing mechanism. A sleeve 64 is centrally arranged on the plate 61 and projects in an opposite direction from the toothed flange 62 so as to receive the shaft 64' and a sleeve 65 is keyed thereto and slidable therein. The knob 68 is provided with the internally threaded cylinder 66 fixed to the housing. The sleeve 65 is fixed to the knob 68 as at 69' so as to move in and out of the sleeve 64 but so as not to rotate independently of the knob 68. A lug 70 projects from the interior of the sleeve 65 so as to be received in the groove 63 which is spirally arranged in the shaft 64'. By rotating the knob 68 the cylinder 66 is moved in or out on the cylinder 67 thereby moving sleeve 65 in or out on shaft 64' which causes the plate 61 to be advanced or retarded in relation to sprocket 36 because of lug 70 and groove 63 and thus the film may be properly framed.

A guard frame 75 pivotally carried on the lever 76 which is fulcrumed at 77 and operable by the handle 78, tends to keep the film in engagement with the sprocket 36 and for this purpose is provided at each end with rollers 79. A lever 80 is pivoted adjacent each of the rollers 42 and 43 and is provided with a roller 81 at one end and a handle 82 at its other end. The springs 83 hold these levers 80 in a position so that their rollers 81 will hold the film in engagement with the rollers 42 and 43.

To thread the machine the upper lever 80 is fulcrumed so as to separate the roller 81 from the roller 42 after the reel has been placed in the upper magazine and unrolled about three feet, the film is brought under the feed roller 42 placed the perforations in the film over its sprocket teeth 44. The film is now trained or looped over the safety roller 49 making a good size loop between the roller 42 and the upper roller 79. The film is now trained about the sprocket 36 between the guide rollers 49 being sure to place all perforations in right-hand side of film over the toothed portion of the plate 61 and making proper adjustment so that a picture exactly fits each of the flat surfaced openings by use of the framing mechanism heretofore described, and the picture will then be in frame on the screen when the machine starts. The lower lever 80 is actuated so as to separate its roller 81 from the take-up roller 43 and another good size loop 50 is made so that the film may be passed over the doller 43 and passed through the slot 84 in the base of the head 11 and fastened to the take-up reel in a manner well understood in the art.

The above described embodiment of my invention has been illustrated and explained as an example and of course I do not wish to be limited to the specific construction set forth heretofore except as hereinafter limited by the appended claim.

Having thus described my invention what I claim as new is:—

In combination, a shaft, means for rotating the shaft, a shutter on said shaft, a gear element on said shaft adapted to impart an intermittent motion, a framing sprocket, means for rotating the sprocket through the intermittent gear element on said shaft, a film holding mechanism associated with said sprocket, and means on said shaft for intermittently operating said film holding mechanism.

In testimony whereof I affix my signature in presence of two witnesses.

OLIVER J. ARNETT.

Witnesses:
F. E. WOODALL,
Y. T. JACKSON.